United States Patent
Arnout et al.

Patent Number: 5,165,602
Date of Patent: Nov. 24, 1992

[54] PROCESS AND DEVICE FOR CUTTING BY LIQUID JET

[75] Inventors: Michel Arnout, Franconville; Jean-Yves Thonnelier, Voisin Le Bretonneux, both of France

[73] Assignee: Lair Liquide, France

[21] Appl. No.: 659,000

[22] Filed: Feb. 21, 1991

[30] Foreign Application Priority Data

Feb. 23, 1990 [FR] France .................... 90 02238

[51] Int. Cl.⁵ .................... B05B 7/00; B23K 7/00
[52] U.S. Cl. .................... 239/8; 239/419.3; 239/424; 239/434.5; 83/177; 266/48
[58] Field of Search ............ 239/8, 13, 419.3, 423, 239/424, 428, 434.5; 83/53, 177; 148/9 R; 266/48

[56] References Cited

U.S. PATENT DOCUMENTS

| | | | |
|---|---|---|---|
| 2,094,641 | 10/1937 | Deming | 148/9 R |
| 2,205,499 | 6/1940 | Smith | 148/9 R |
| 3,463,601 | 8/1969 | Childree | 266/48 X |
| 3,674,213 | 7/1972 | LeMounier | 239/428 X |
| 3,788,558 | 1/1974 | Ujiie et al. | 239/424 |
| 4,184,637 | 1/1980 | Mushenko et al. | 239/424 X |
| 4,765,846 | 8/1988 | Grohmann | 148/9 R |
| 4,787,404 | 11/1988 | Klosterman et al. | 239/424 X |
| 4,830,681 | 5/1989 | Arnout et al. | |
| 4,908,070 | 3/1990 | Grohmann | 266/48 X |
| 4,938,455 | 7/1990 | Grohmann | 266/48 |
| 4,995,918 | 2/1991 | Grohmann | 266/48 X |

FOREIGN PATENT DOCUMENTS

| | | | |
|---|---|---|---|
| 0287420 | 10/1988 | European Pat. Off. | |
| 0338211 | 10/1989 | European Pat. Off. | |
| 300705 | 5/1919 | Fed. Rep. of Germany | 239/419.3 |
| 1752904 | 4/1971 | Fed. Rep. of Germany | |
| 2215538 | 11/1972 | Fed. Rep. of Germany | |
| 2407632 | 9/1974 | Fed. Rep. of Germany | |
| 71271 | 11/1970 | German Democratic Rep. | |
| 567019 | 8/1977 | U.S.S.R. | 239/423 |
| 1243831 | 7/1986 | U.S.S.R. | |
| 12225 | of 1909 | United Kingdom | |
| 2109533 | 6/1983 | United Kingdom | 239/423 |

*Primary Examiner*—Andres Kashnikow
*Assistant Examiner*—William Grant

[57] ABSTRACT

The process consists in providing at the outlet of a cutting nozzle, a central jet of cutting liquid and, simultaneously, a concentric jet of gas around the central jet of liquid, the jet of gas having a higher speed than that of the liquid jet. Typically, the liquid and the gas have the same composition, preferably oxygen. A device for carrying out the process is also disclosed.

15 Claims, 2 Drawing Sheets

PROCESS AND DEVICE FOR CUTTING BY LIQUID JET

BACKGROUND OF INVENTION

1. (a) Field of the Invention

It is an object of the present invention to provide processes for cutting or shearing materials in which there is provided, at the outlet of a cutting nozzle, a jet of liquid under high pressure.

2. (b) Description of Prior Art

The processes for cutting by means of a jet of liquid, for example a cryogenic liquid, are faced with a problem of cohesion of the jet of liquid, by reason of for example the appearance of poorly controlled phenomenons of a boundary layer at the interface between the periphery of the jet of liquid and its environment, the latter being generally highly swirling when in use. These problems restrict the operation of the process, for example with respect to the speed of flow, to ensure that deep cuts with an acceptable trench width are obtained.

SUMMARY OF INVENTION

It is an object of the present invention to propose a new process of cutting enabling to provide the jet of liquid with a better cohesion on a longer distance at the outlet of the nozzle, and therefore to enable to obtain cuts which are faster, more carefully executed and/or with an increased flexibility of use.

For this purpose, according to a characteristic of the process according to the invention, there is provided simultaneously, in the nozzle, a jet of gas around the jet of liquid, the exit speed of the jet of gas being higher than the exit speed of the jet of liquid, typically, at least twice the speed of the jet of liquid. Preferably, the liquid and the gas have the same composition.

The provision of homogeneous jets of gas is exactly controllable and enables to produce, around the central jet of liquid, an interface with parallel speed of flow, limiting the occurrences of boundary layer at the periphery of the jet of liquid and thus ensuring to the latter a suitable homogeneity and cohesion on a distance of many centimeters at the outlet of the nozzle.

According to a more particular aspect of the invention, which is suitable for the rapid and in depth shearing of metallic materials, the liquid and the gas are oxygen.

The oxycutting with a jet of liquid oxygen surrounded with a jet of gaseous oxygen have been found to be particularly interesting in iron and steel metallurgy, for example for the cutting of bands or slabs of metal directly at the outlet of continued casting. As a matter of fact, since the jet of liquid has an increased cohesion on a more substantial distance, it is possible to operate with a more substantial distance between the cutting nozzle and the piece to be cut, which increases the life span of the cutting device. On the other hand, the presence of a sheath of gaseous oxygen highly facilitates the operation of initiating the edging of a band or a slab. On the other hand, in the case of an accidental stoppage in the feed of liquid oxygen, the cut can be continued, although at more reduced speed, with gaseous oxygen only.

It is another object of the present invention to propose a device for carrying out the above process, of the type comprising a cutting nozzle including a first channel terminating into an outlet opening and means for supplying the first channel with a liquid under pressure, in which the nozzle includes a second channel concentrically provided around the first channel and feeding into the outlet opening, means being provided to supply a gas under pressure in the second channel.

BRIEF DESCRIPTION OF DRAWINGS

Other characteristics and advantages of the present invention will appear from the description which follows of embodiments, given by way of illustration but without limitation, with reference to the annexed drawings, in which.

DESCRIPTION OF PREFERRED EMBODIMENTS

Figure 1:
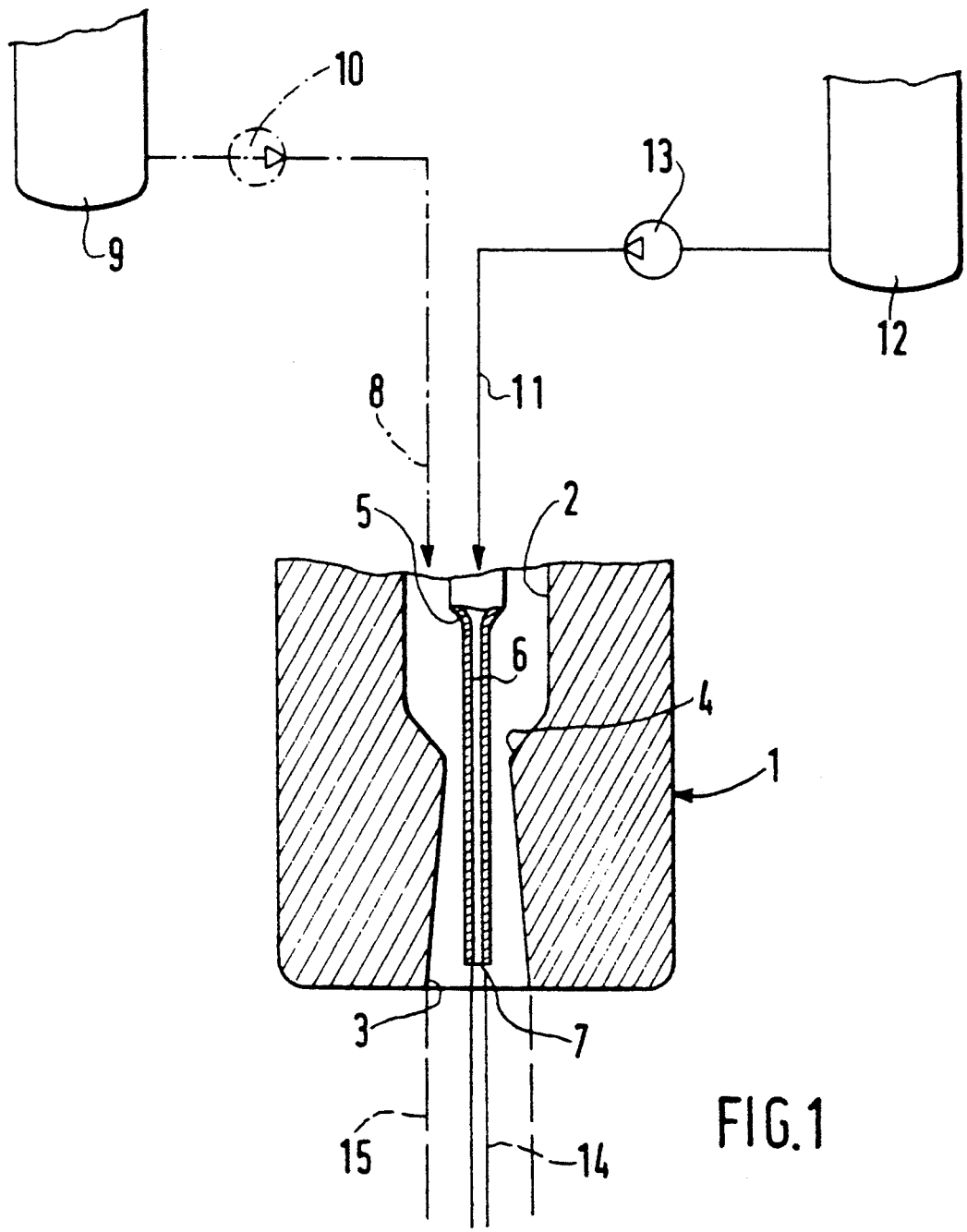
FIG. 1 is a schematic view of a device for carrying out the process according to the invention.

There is illustrated in FIG. 1 an apparatus for cutting with a jet of liquid comprising a cutting nozzle 1 in which there is provided a channel 2 for ejecting gas under pressure. To obtain a high outlet speed without bursting of the gaseous jet, in the vicinity of its outlet opening 3, channel 2 has an inner convergent-divergent shape, defining a neck 4 of reduced cross-section, commonly called Laval tuyere. In channel 2, there is concentrically and coaxially disposed, a central tubular member 5 defining, upstream of the outlet opening 3, an internal channel 6 of small transverse dimension. Typically, the outlet end 7 of the channel 6 is located upstream of the outlet opening 3 of the nozzle 1.

Channel 2 is supplied, by means of a piping 8, with a gas under pressure originating from a gas container 9, which is pressurized, if necessary, by means of a compressor 10. Similarly, channel 6 is supplied, by means of a piping 11, with a liquid under pressure from a liquid container 12 and which is pressurized by means of a pump 13. It will be understood that the jet of high pressure liquid 14 which exits at the outlet end 7 of channel 6 is concentrically surrounded by means of a coaxial tubular jet of gas 15 which exits from the outlet opening 3 of nozzle 1 at a higher speed than that of the particles of liquid of jet 14, with the result that the jet 14 does not face problems of interface with the surrounding atmosphere.

The process according to the invention finds a particularly advantageous application for the in depth oxycutting of metallic materials at high speed, such as ingots, slabs or plates, for example directly at the outlet of continued casting or in cold state. In this case, the liquid under high pressure is made of a liquid or combustible liquid mixture, preferably liquid oxygen or a mixture of oxygen and ozone, the gas under pressure supplied by piping 8 being in this case gaseous oxygen. Piping 11 is provided with an insulating sheath, for example a sheath under vacuum and/or produced by circulation of a cryogenic liquid such as liquid nitrogen. The pressure of liquid oxygen supplying channel 6 is higher than 10 MPa, the pressure of gaseous oxygen supplying channel 2 being higher than 0.15 MPa to give a sonic or supersonic ejection of the jet of gas, while the speed of the jet of liquid remains lower than 200 m/s. Typically, the pressure of liquid oxygen is higher than 30 MPa, typically of the order of 40 to 50 MPa, the pressure of the gaseous oxygen being higher than 0.5 MPa, typically of the order of 0.7 to 0.8 MPa.

Figure 2:
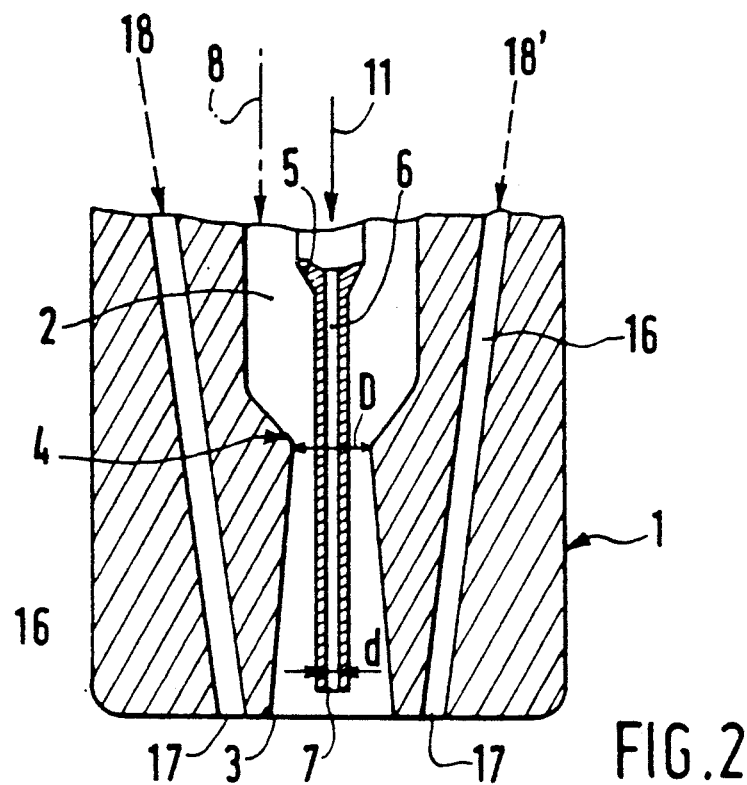
FIGS. 2 and 3 are two variants of the cutting nozzle of FIG. 1.
Figure 3:
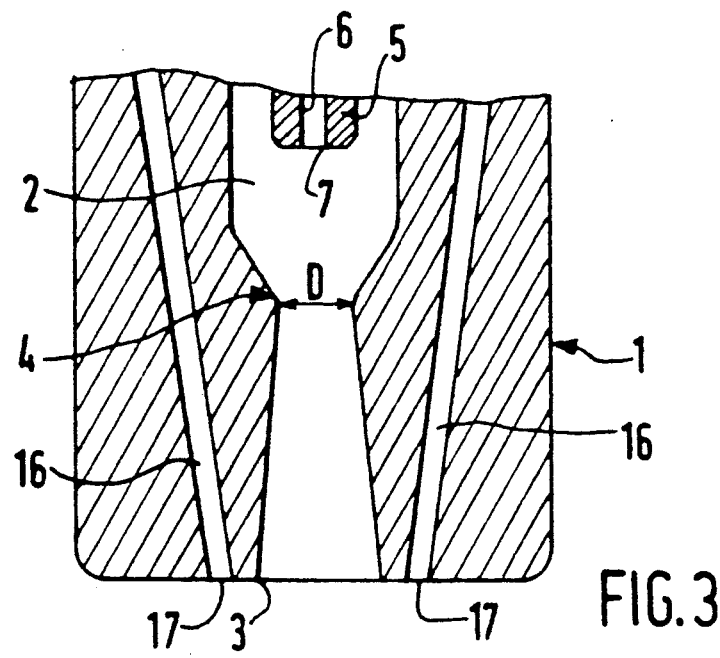

According to a particular aspect of the invention, as illustrated in FIGS. 2 and 3, to provide a preheating of the metallic material to be cut and to promote a mixed mechanical and chemico-thermic effect of the liquid oxygen which is ejected, the nozzle 1 includes a series of third channels 16, concentrically disposed around channels 2 and 6 and converging towards the outlet opening 3 of the nozzle 1, around which they open as a crown of openings of circular ejection 17. The third channels 16 are supplied, by means of pipings 18,18' with oxycombustible gases, for example oxy-butane, oxy-propane, preferably a mixture of oxygen and a compound of propylene and methyl-acetylene which is sold under the designation "Tetrene" or a mixture of oxygen and a compound of ethylene and acetylene sold under the designation "Crylene", under a pressure typically comprises between 20 KPa and 50 KPa. In this case, since the compound "Crylene" is available in liquid form, one should advantageously consider the possibility of providing a sheath for the line of liquid oxygen 11 by means of a duct of liquid "Crylene", to enable a superinsulation of the liquid oxygen piping and a pre-vaporization of the compound "Crylene" at its inlet into nozzle 1.

The diverging angle of the Laval tuyere typically comprises between 3 and 7 degrees. In the application where the liquid and the gas are oxygen, the diameter D of the sonic neck 4 is advantageously comprised between 1.6 and 3.2 mm, the diameter d of the channel 6 of liquid oxygen being comprised between 0.3 and 0.4 mm.

In the embodiment of FIG. 3, to take care of the problems of size of tubular member 5 and neck 4, the tubular member 6 is shortened so that its outlet end 7 is located upstream of the neck 4, which promotes, at the level of the latter, a slight acceleration of the liquid jet by providing an increased flow of sheathing gas. In this case, the diameter D of neck 4 can be reduced to a value lower than 1 mm, which enables to still reduce the true diameter of the jets 14 and 15 and therefore to reduce the widths of the trench.

We claim:

1. A process for cutting materials comprising the steps of ejecting from a cutting nozzle, a central cutting jet of high pressure liquid and a tabular jet of gas surrounding the central cutting jet of liquid, the liquid and gas being of the same composition and the speed of ejection of the tubular jet of gas being higher than the speed of ejection of the jet of liquid.

2. Process according to claim 1, wherein the speed of the tubular jet of gas ejected from the nozzle is at least double the speed of the central cutting jet of liquid.

3. Process according to claim 1, wherein the jets of liquid and of gas are formed coaxially in the nozzle.

4. Process according to claim 1, wherein the liquid and gas consist of oxygen.

5. Process according to claim 4, wherein liquid oxygen is supplied to the nozzle at a pressure higher than 10 MPa, and gaseous oxygen is supplied at a pressure higher than 0.15 MPa.

6. Process according to claim 4, which additionally comprises forming in the nozzle, at least one jet of oxycombustible gas spaced radially outside the jet of gaseous oxygen.

7. In a liquid jet cutting device, having a source of gas under pressure and a source of liquid under high pressure, the gas and liquid being of the same composition, a cutting nozzle for ejecting a liquid jet sheathed by a gaseous jet and having a first channel connectable to said source of gas, said first channel opening outwardly through a first ejection orifice; and a second channel connectable to said source of liquid, said second channel being disposed centrally and concentrically within the first channel and opening into the first channel, so as to eject a cylindrical jet of high pressure liquid surrounded by a tubular jet of gas.

8. The nozzle of claim 2, wherein the first channel has a constricting neck portion between an upstream convergent portion and a downstream divergent portion, said neck portion diverging towards the ejection orifice.

9. The nozzle of claim 8, wherein the second channel opens into the first channel upstream of the neck portion.

10. The nozzle of claim 8, wherein the neck portion has a diameter within the range 1.6 to 3.2 mm.

11. The nozzle of claim 10, wherein the second channel has an internal diameter within the range 0.3 to 0.4 mm.

12. The nozzle of claim 7, wherein the source of gas is a source of gaseous oxygen and the source of liquid is a source of liquid oxygen.

13. The nozzle of claim 12, further comprising at least a third channel for ejecting a jet of oxy-combustible gas, said third channel opening outwardly through a second ejection orifice spaced radially outwardly from the first ejection orifice.

14. The nozzle of claim 13, comprising a plurality of third channels opening outwardly around the first ejection orifice though a plurality of circularly arranged second ejection orifices.

15. The nozzle of claim 14, wherein the third channels converge towards the first ejection orifice.

* * * * *

UNITED STATES PATENT AND TRADEMARK OFFICE
CERTIFICATE OF CORRECTION

PATENT NO. : 5,165,602
DATED : November 24, 1992
INVENTOR(S) : Michel Arnout et al.

It is certified that error appears in the above-identified patent and that said Letters Patent is hereby corrected as shown below:

Claim 1, line 3 (column 3, line 45), change "tabular" to --tubular--.

Signed and Sealed this

Twelfth Day of October, 1993

Attest:

BRUCE LEHMAN

*Attesting Officer*     *Commissioner of Patents and Trademarks*